United States Patent
Boldrin et al.

(10) Patent No.: US 10,887,162 B2
(45) Date of Patent: *Jan. 5, 2021

(54) DYNAMIC PLANNING AND CONFIGURATION BASED ON INCONSISTENT SUPPLY

(71) Applicant: International Business Machines Corporation, Armonk, NY (US)

(72) Inventors: Warren Boldrin, Montgomery, NY (US); Oswald J. Mantilla, Wappingers Falls, NY (US); Jason McAllister, Poughkeepsie, NY (US); Chanchal Saha, Jessore (BD)

(73) Assignee: International Business Machines Corporation, Armonk, NY (US)

( * ) Notice: Subject to any disclaimer, the term of this patent is extended or adjusted under 35 U.S.C. 154(b) by 599 days.

This patent is subject to a terminal disclaimer.

(21) Appl. No.: 14/972,546

(22) Filed: Dec. 17, 2015

(65) Prior Publication Data
US 2017/0180197 A1 Jun. 22, 2017

(51) Int. Cl.
*H04L 12/24* (2006.01)
*H04L 29/08* (2006.01)

(52) U.S. Cl.
CPC ...... *H04L 41/0806* (2013.01); *H04L 41/5041* (2013.01); *H04L 67/10* (2013.01); *H04L 67/141* (2013.01)

(58) Field of Classification Search
CPC ... H04L 41/0806; H04L 67/10; H04L 67/141; H04L 41/0541; G06Q 10/087; G06Q 10/0875
See application file for complete search history.

(56) References Cited

U.S. PATENT DOCUMENTS

| | | | |
|---|---|---|---|
| 7,212,976 B2 | 5/2007 | Scheer | |
| 7,246,080 B2 | 7/2007 | Feldman et al. | |
| 7,313,534 B2 | 12/2007 | Scheer | |
| 7,324,966 B2 | 1/2008 | Scheer | |
| 8,055,522 B2 | 11/2011 | Eck et al. | |

(Continued)

OTHER PUBLICATIONS

Cao, Heng, et al. "Supply chain simulation: a simulation-based tool for inventory analysis in a server computer manufacturing environment." Proceedings of the 35th conference on Winter simulation: driving innovation. Winter Simulation Conference, 2003. (Year: 2003).*

(Continued)

*Primary Examiner* — Omar F Fernandez Rivas
*Assistant Examiner* — Joshua E. Jensen
(74) *Attorney, Agent, or Firm* — Lieberman & Brandsdorfer, LLC

(57) ABSTRACT

The embodiments relate to dynamic server drawer build plan management. Output data associated with a data source is received. A drawer build plan list and one or more inventory scenarios are generated based on the received data. At least one build plan is chosen from the build plan list, and one or more drawer design configurations are compared to at least one inventory scenario to produce a set of eligible drawer design configurations. A drawer design configuration is selected from the set for one or more respective drawer build plans based on one or more constraints. A connection is established to a computer, and information associated with each selected drawer design configuration is transmitted to the second computer.

20 Claims, 13 Drawing Sheets

(56) References Cited

U.S. PATENT DOCUMENTS

| | | | |
|---|---|---|---|
| 8,527,322 B2 | 9/2013 | Ettl et al. | |
| 2005/0288808 A1* | 12/2005 | Lopez | G06F 17/50 |
| | | | 700/97 |
| 2009/0276771 A1* | 11/2009 | Nickolov | G06F 9/4856 |
| | | | 717/177 |
| 2010/0205044 A1* | 8/2010 | Scheer | G06Q 10/087 |
| | | | 705/28 |
| 2017/0132746 A1* | 5/2017 | Wilt | G06F 9/445 |
| 2018/0284986 A1* | 10/2018 | Bhagi | G06F 11/2056 |

OTHER PUBLICATIONS

Ramakrishnan, S., et al. "An Alternative Configuration Management Approach for Fabrication Testing in a Server Assembly Environment." IIE Annual Conference. Proceedings. Institute of Industrial and Systems Engineers (IISE), 2007. APA (Year: 2007).*

Drayer, Christiana M., et al. "A Simulation-based Approach for Resource Planning for a Service Upgrade Unit in a High-end Server Manufacturing Environment." IIE Annual Conference. Proceedings. Institute of Industrial and Systems Engineers (IISE), 2008. (Year: 2008).*

Chivukula, S., et al. "Optimization of Inventory Pick-up Time in a Server Manufacturing Environment." Optimization (2013). (Year: 2013).*

Wieland, Brian, et al. "Optimizing inventory levels within Intel's channel supply demand operations." Interfaces 42.6 (2012): 517-527. (Year: 2012).*

Frachtenberg, Eitan, et al. "High-efficiency server design." Proceedings of 2011 International Conference for High Performance Computing, Networking, Storage and Analysis. 2011. (Year: 2011).*

* cited by examiner

|  | N1CP0 | N1CP1 | N1CP2 | N0CP0 | N0CP1 | N0CP2 |
|---|---|---|---|---|---|---|
| Primary $K=1$ | 6H | 7M | 6M | 6M | 7M | 7M |
| Alternative $k=2\ldots K$ | 6M | 7L | 6L | 6L | 7L | 7L |
|  | 6L | 8L | 7L | 7L | 8L | 8L |
|  | 7M |  |  |  |  |  |
|  | 7L |  |  |  |  |  |
|  | 8L |  |  |  |  |  |

FIG. 3

| i | $DC_{391i}$ | $DC_{421i}$ | $P_{39} \times DC_{391i}$ | $P_{42} \times DC_{421i}$ | $QS_i$ |
|---|---|---|---|---|---|
| 8H | 0 | 0 | 0 | 0 | 0 |
| 8M | 0 | 1 | 0 | 1 | 1 |
| 8L | 0 | 0 | 0 | 0 | 0 |
| 7H | 0 | 0 | 0 | 0 | 0 |
| 7M | 3 | 4 | 6 | 4 | 10 |
| 7L | 0 | 0 | 0 | 0 | 0 |
| 6H | 1 | 0 | 2 | 0 | 2 |
| 6M | 2 | 1 | 4 | 1 | 5 |
| 6L | 0 | 0 | 0 | 0 | 0 |
|   |   |   | 12 | 6 | 18 |

| |
|---|
| $F_{39} = 10$ |
| $\alpha_{39} = 20\%$ |
| $P_{39} = 2$ |
| $F_{42} = 6$ |
| $\alpha_{42} = 20\%$ |
| $P_{42} = 1$ |

FIG. 10

DYNAMIC PLANNING AND CONFIGURATION BASED ON INCONSISTENT SUPPLY

BACKGROUND

The embodiments described herein relate generally to server drawer production. More specifically, the embodiments described herein relate to dynamically managing server drawer production.

At present, server drawers ("drawers") are planned and built in 39-way and 42-way capabilities, referred to herein as drawer types. Each drawer type requires an acceptable arrangement of processor chip components for predictable function and performance. However, drawer component inventory supply is generally inconsistent and is based on various interdependencies due to, for example, variability associated with the chip manufacturing process. Proper planning is needed to ensure that demand for drawers can be met by current and prospective levels of inventory supply. Further planning is beneficial with respect to dynamically shape the inventory supply by incorporating future drawer demand and component testing failures.

SUMMARY

The aspects described herein include a system and computer program product for dynamic server drawer production management.

According to one aspect, a system is provided to dynamically manage server drawer design configurations. The system includes a first computer having an installed application is in communication with the processor, the application to output data, including demand data and inventory data, associated with a data source of the first computer. A transmission server is in communication with the first computer to receive the output data over a network connection. The transmission server includes memory for storing remote subscriber information, the remote subscriber information including the received data and a destination address associated with a second computer. The transmission server has a processing device to generate a drawer build plan list having one or more drawer build plans based on the received dataset, and generate one or more inventory scenarios based on the inventory data. The processing device compares at least one drawer build plan from the list to at least one inventory scenario to produce a set of eligible drawer design configurations. Each drawer design configuration corresponds to a drawer type of a respective chosen build plan. The processing device selects at least one drawer design configuration the set for one or more respective drawer build plans based on one or more constraints. The processing device establishes a connection to the second computer via the destination address, and transmits information associated with each selected drawer design configuration to the second computer for visual display.

According to another aspect, a computer program product is provided to dynamically manage server drawer design configurations. The computer program product includes a computer-readable storage device having computer-readable program code embodied therewith. The program code is executable by a processor to provide an application to a remote subscriber for installation on a first computer. The program code outputs data associated with a data source of the first computer from the application, the output data including demand data and inventory data. A transmission server receives the output data over a network connection. The transmission server includes memory for storing remote subscriber information, the remote subscriber information including the received data and a destination address associated with a second computer. The transmission server has a processing device for executing program code to generate a drawer build plan list having one or more drawer build plans based on the received dataset, and generate one or more inventory scenarios based on the inventory data. Program code executable by the processing device compares at least one drawer build plan from the list to at least one inventory scenario to produce a set of eligible drawer design configurations. Each drawer design configuration corresponds to a drawer type of a respective chosen build plan. Program code executable by the processing device selects at least one drawer design configuration the set for one or more respective drawer build plans based on one or more constraints. Program code executable by the processing device establishes a connection to the second computer via the destination address, and transmits information associated with each selected drawer design configuration to the second computer for visual display.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

FIG. 3 depicts exemplary drawer data tables generated by the system of FIG. 2, according to an embodiment.

FIG. 10 depicts a table illustrating an exemplary quantity surplus calculation of drawer component inventory, according to an embodiment.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Figure 1:
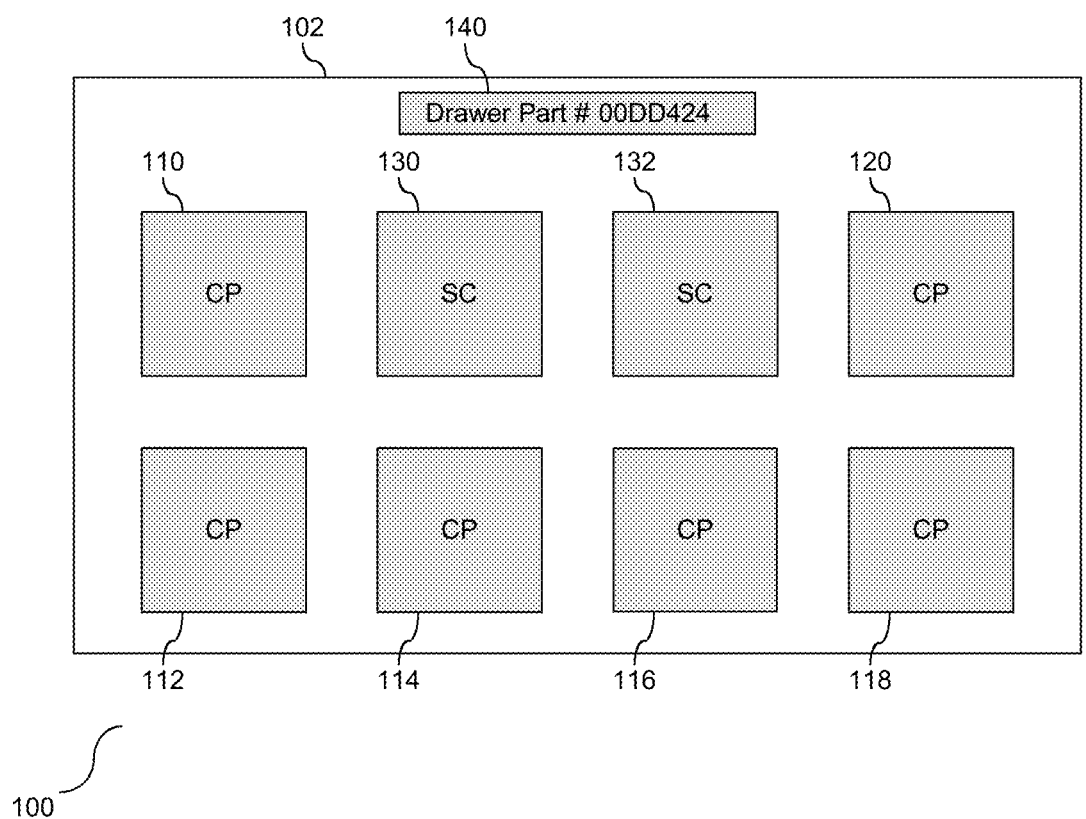
FIG. 1 depicts a block diagram illustrating a server drawer design configuration, according to an embodiment.

For the sake of brevity, the following glossary includes a list of notations that will be used throughout the detailed description herein to describe the various aspects and embodiments:

SCM=Single chip module
SC=System controller
CP=Central processor
DDC=Drawer design configuration
J=Number of drawers types
L=Total current drawer demand quantities
N=Number of CP types
K=Number of design configurations of j-th drawer type ∀ j=1 . . . J (k=1: primary design combination)
M=CP count of a drawer
$D_j$=Current demand quantities of j-th drawer type ∀ j=1 . . . J
$F_j$=Future demand quantities of j-th drawer type ∀ j=1 . . . J
$P_j$=Future demand quantities of j-th drawer type that need to be fulfilled by current inventory ∀ j=1 . . . J
X=Drawer type that has lowest non-zero demand
$X_D$=Demand quantities for X
$UD_j$=Unassigned demand quantities of each drawer type ∀ j=1 . . . J
$e_l$=Build plan list ∀ l=1 . . . L
$e'_l$=Unassigned build plan list ∀ l=1 . . . L
$d_l$=Drawer assignment list ∀ l=1 . . . L
$BP_{jl}$=j-th drawer assigned at l-th position in the build plan
$I_P$=Inventory phase, P=A, A' or R; A=Actual, A'=Adjusted, & R=Revised
$A_i$=Actual inventory of i-th CP type ∀ i=1 . . . N
$AP_i$=Percentage of actual inventory of i-th CP type ∀ i=1 . . . N
$A'_i$=Adjusted inventory of i-th CP type ∀ i=1 . . . N
$IP_i$=Percentage of incoming inventory of i-th CP type ∀ i=1 . . . N
$R_i$=Revised inventory of i-th CP type ∀ i=1 . . . N
$S_i$=Surplus inventory of i-th CP type ∀ i=1 . . . N
$S_p$=Surplus inventory of p-th CP configuration type ∀ i=1 . . . N
$RS_i$=Revised surplus inventory of i-th CP type ∀ i=1 . . . N
$DC_{jk}$=k-th drawer design configurations of j-th drawer type ∀ k=1 . . . K, j=1 . . . J
$DC_{jkm}$=j-th drawer type of k-th drawer design configurations and m-th CP count ∀ j=1 . . . J, k=1 . . . K, m=1 . . . M
$DC_{jki}$=j-th drawer type of k-th drawer design configurations and i-th CP types ∀ j=1 . . . J, k=1 . . . K, i=1 . . . N
$W_{jm}$=Weights for m-th CP count for j-th drawer type ∀ j=1 . . . J
$\alpha_j$=Percentage of future demand that need to be fulfilled for j-th drawer type ∀ j=1 . . . J
$AC_{ip}$=p-th alternative CP configuration for i-th CP type ∀ i=1 N, p=1 . . . N
$QR_{ip}$=Replenished quantity of i-th CP type from p-th CP configuration surplus $S_p$ ∀ i=1 . . . N, p=1 . . . N
$QR_i$=Replenished quantity of i-th CP type from surplus ∀ i=1 . . . N
$QS_i$=Surplus quantity of i-th CP type meet all $P_j$ ∀ i=1 . . . N
Y=i-th CP type that has the highest QSi ∀ i=1 . . . N FIG. 1 depicts a block diagram (100) illustrating a generalized server drawer, drawer (102). As shown, drawer (102) has eight slots (110), (112), (114), (116), (118), (120), (130), and (132) for housing single chip modules (SCMs). The SCMs include central processors (CPs) and system controllers (SCs). Six of the slots (110)-(120) are occupied by CPs, while the remaining two drawer slots (130) and (132) are reserved for SCs. Each drawer that is built may be associated with a discrete level within the server. In one embodiment, a drawer part number, or part number, may be assigned to indicate at which level the drawer should be stored. As shown, drawer (102) is assigned a part number #00DD424 (140). Accordingly, each drawer is arranged having 2 SCs, 6 CPs, and may include an optionally assigned part number.

It is to be understood that the drawer (102) is provided solely as an illustrative example, and it is to be appreciated that various configurations of drawers, and more specifically, the CPs and SCs, may be realized in accordance with the embodiments described herein.

Each CP is associated with a performance level determined by a performance test (e.g., an electrical performance test) conducted during the chip manufacturing process. In one embodiment, the performance levels include high performance (H), medium performance (M), and low performance (L). Such performance tests are known in the art, and are outside the scope of the embodiments described herein, and are hereby incorporated by reference. Accordingly, a further description of such performance tests will not be provided herein.

Each CP is further associated with a number of CP cores, or cores. In one embodiment, the number of cores of a CP can range from a minimum of 6 cores to a maximum of 8 cores. Since each drawer has six slots for CPs, the (theoretical) minimum number of total cores for a drawer is 36, while the (theoretical) maximum number of total cores for a drawer is 48.

Each CP may be associated with a particular CP-type. In one embodiment, a CP-type of a CP includes the performance level of the CP, and the quantity of cores of the CP. For example, a CP-type of 6M corresponds to a CP having six cores and a medium performance level, while a CP-type of 8H corresponds to a CP having eight cores and a high performance level.

An eligible arrangement of drawer components is referred to herein as a drawer design configuration, or DDC. In one embodiment, an arrangement of the CPs and SCs within a proposed drawer is determined to be a DDC based in part on a drawer type of the proposed drawer. In one embodiment, the drawer type corresponds to a minimum number of total cores that must be present within the arrangement. Drawer types may include, but are not limited to, 39-way drawer types and 42-way drawer types. Thus, a 39-way drawer type corresponds to a drawer in which a DDC may include a minimum of 39 cores and a maximum of 48 cores, while a 42-way drawer type corresponds to a drawer in which a DDC may include a minimum of 42 cores and a maximum of 48 cores. Accordingly, each DDC designates six slots for six respective CPs, with each CP having a CP-type designating a respective number of cores (e.g., 6, 7, or 8 cores) and a performance level, such that the total number of cores is at least equal to the number indicated by the drawer type.

In one embodiment, a dynamic DDC planning framework is implemented to incorporate data from various sources to select a DDC based on one or more constraints. Such constraints are designed to filter a collection or set of potential DDCs in order to choose the most efficient DDC for a given drawer build plan. In one embodiment, the dynamic DDC planning framework may be divided into two sections. The first section is called "Scheduled Batch Runs", and the second section is called an "Execution Runs" section. The Scheduled Batch Runs section operates on a schedule to update drawer data stored in a data source, such as a database. The Scheduled Batch Runs section supplies the Execution Runs section with data. Based on the data supplied by the Schedule Batch Runs section, the Execution Runs section selects a DDC based on one or more constraints.

Figure 2:
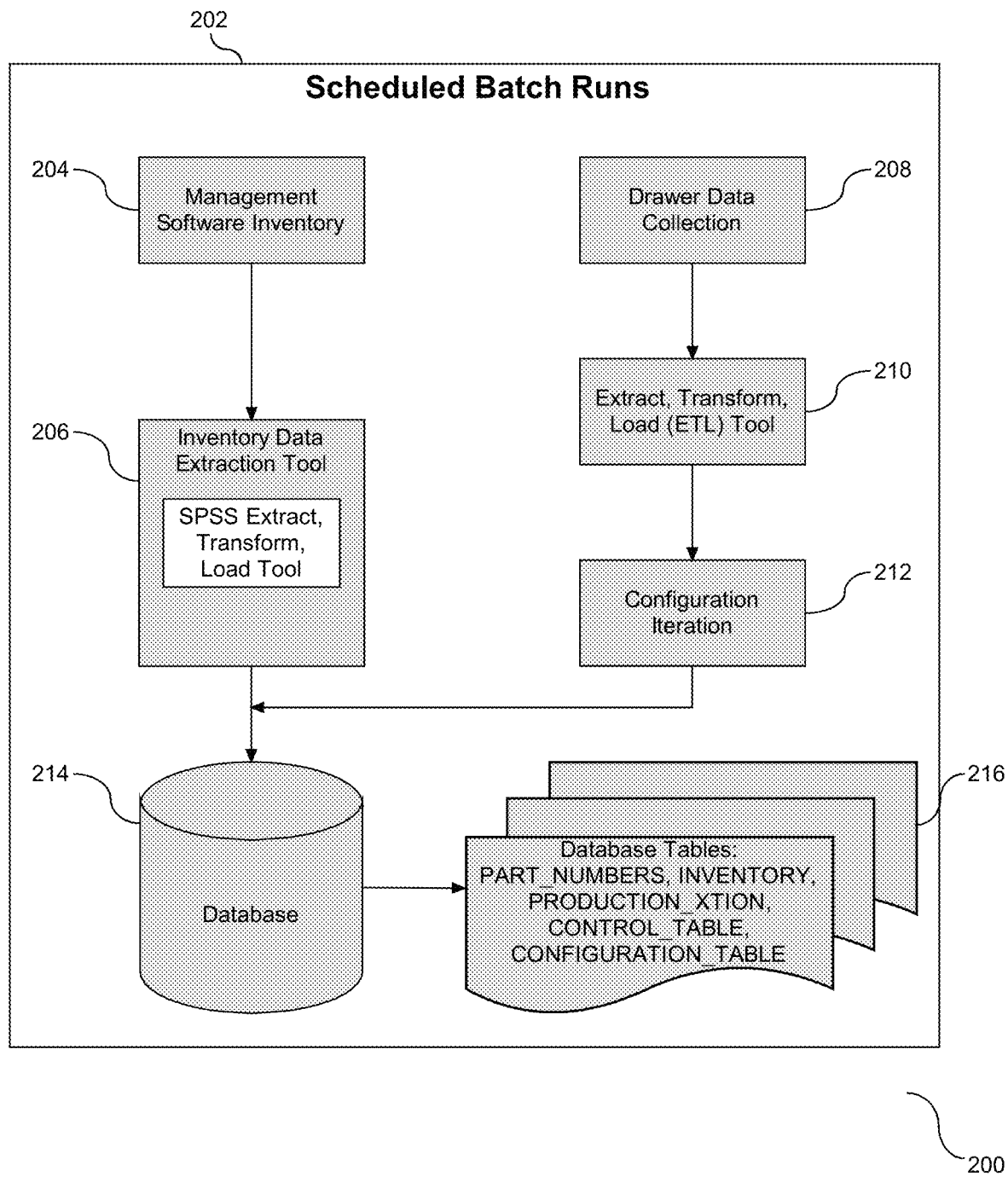
FIG. 2 depicts a block diagram illustrating an overview of a system to perform scheduled batch runs associated with dynamic drawer configuration planning, according to an embodiment.

FIG. 2 depicts a block diagram (200) illustrating an overview of a system having tools to perform scheduled batch runs (202), according to an embodiment. In one embodiment, inventory supply data is obtained from an inventory data source tool, such as Inventory Management Software (IMS) tool (204). Data obtained from the IMS tool (204) is associated with drawer component inventory, including CP inventory data. An inventory data extraction tool, such as extract, transform, load tool (ETL) (206), extracts and transforms the CP inventory data. In one embodiment, the extracted and transformed CP inventory data includes data associated with the CP-type. As discussed above, the CP-type includes a number of cores (e.g., 6, 7, or 8) and a performance level (e.g., L, M, and H). The extracted and transformed CP supply data is loaded into database (214) for storage.

Drawer data is obtained from a repository, such as collection of drawer data (208). In one embodiment, the collection of drawer data (208) is associated with drawer demand. The collection of drawer data (208) may include, for example, one or more DDC rules by which each arrangement of SCMs must abide by to be eligible as a DDC. Each rule acts as a constraint on the arrangement of SCMs. A drawer data extraction tool, such as extract, transform, load tool (ETL) (210), extracts and transforms the drawer data. In one embodiment, the extracted and transformed drawer data includes data corresponding to drawer types. The drawer types may include a 39-way drawer and a 42-way drawer, such that the transformed data includes 39-way drawer data, and 42-way drawer data. In one embodiment, the data for each drawer type arrives in a batch, such that there is no priority associated with drawer type.

In one embodiment, the extracted and transformed drawer data further includes data associated with demand quantities corresponding to each drawer type. For example, one or more demand quantities may be assigned to the 39-way drawer type, and one or more demand quantities may be assigned to the 42-way drawer type. The demand quantities may include current demand quantities and future demand quantities.

The extracted and transformed drawer data is loaded into a DDC generation tool, such as configuration iteration tool (212). In one embodiment, configuration iteration tool (212) generates and outputs a list of DDCs from the extracted and transformed data. In one embodiment, the generated list of DDCs may include a primary DDC and one or more possible alternative DDCs, as further described below with reference to FIG. 3. As previously discussed, each drawer has 8 SCM slots, with 6 slots dedicated to CPs and 2 slots dedicated to SCs configured to conform to an eligible arrangement (i.e., a DDC). That is, the generated list of DDCs corresponds to all eligible arrangements of SCMs within the slots of a drawer of a given drawer type. The list of DDCs may be generated by the configuration iteration tool (212) by a variety of methods. In one embodiment, the combination operator (",") is used to generate the list of DDCs. The generated list of DDCs is stored in the database (214). In one embodiment, the output of the inventory data extraction tool (206) and the DDC generation tool (212) are stored in the database (214) in the form of one or more respective database tables (216). The tables (216) may include inventory data tables associated with the inventory data, and drawer data tables associated with the drawer data.

FIG. 3 depicts a block diagram (300) illustrating two examples of drawer data tables. Table (310) depicts a plurality of DDCs associated with a 39-way drawer type. It is to be understood that the choice of a 39-way drawer type is purely exemplary, and it is to be appreciated that the embodiments described herein are not to be limited solely to 39-way drawer types.

In one embodiment, table (310) contains k rows (302), with each of the rows associated with a respective eligible CP configuration. For example, and as shown in table (310), the rows may include a primary DDC row (314) and k−1 alternative DDC rows (316). In one embodiment, table (310) contains six columns (320)-(370), each corresponding to a CP slot within the drawer. For a given DDC, each entry in the table corresponds to a CP-type assigned to a respective CP slot. As shown, each entry includes a number and a letter corresponding to a number of cores of the CP and a performance level of the CP, respectively. For example, the table entry corresponding to the intersection of the primary configuration row (314) and column (320) is 6H, meaning that the CP placed in the first slot of the primary configuration is of the "six-core high performance" CP-type.

Figure 4:
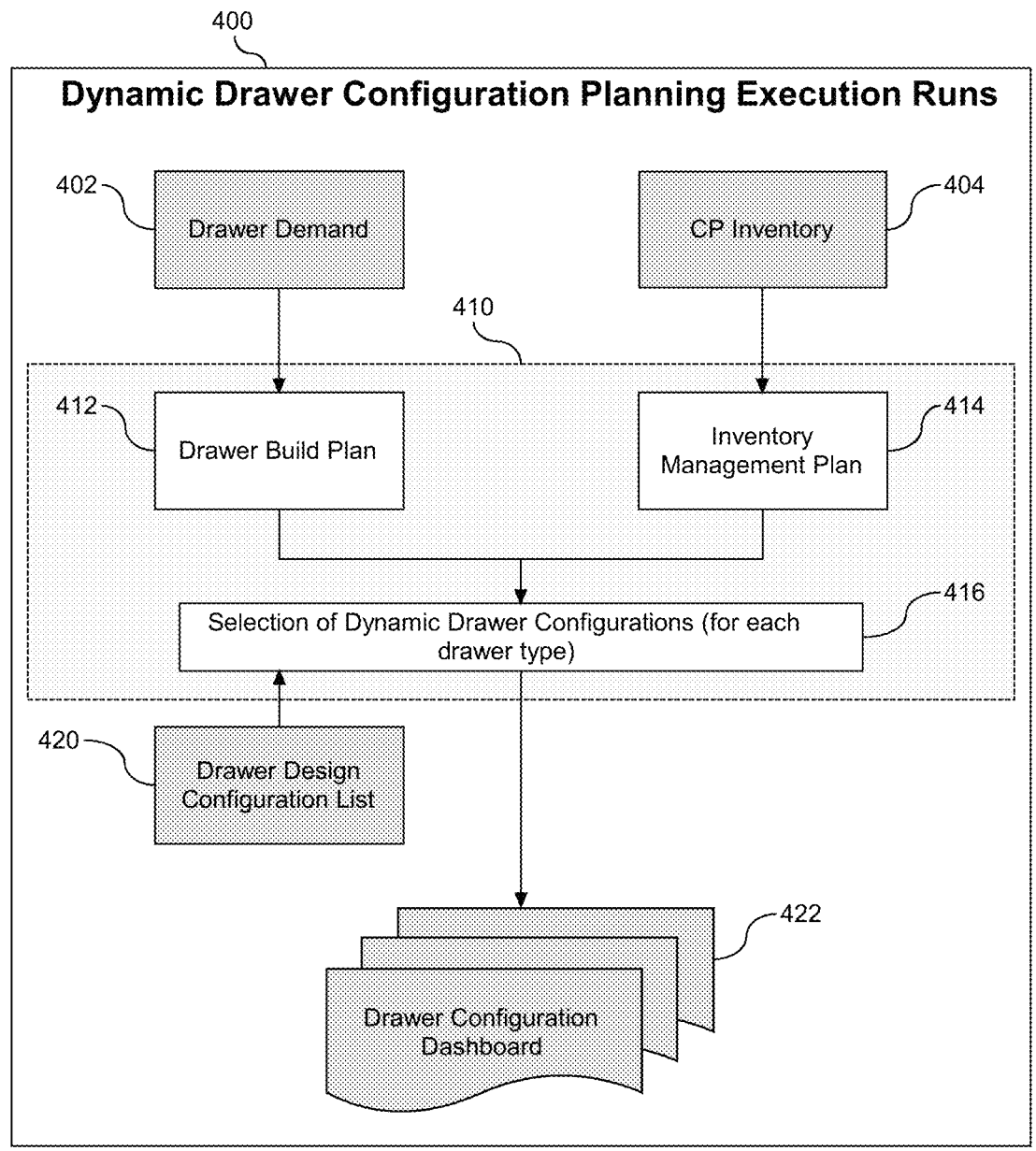
FIG. 4 depicts a block diagram illustrating an overview of a system to perform execution runs associated with dynamic drawer configuration planning, according to an embodiment.

With reference to FIG. 4, a block diagram (400) is provided illustrating an overview of performing execution runs. Execution runs may be implemented by a collection of tools. The term "tools" should be broadly construed to encompass any combination of hardware, software, and/or firmware embodiments configured to implement the execution runs described herein. As shown, drawer demand tool (402) and CP inventory tool (404) are in communication with a set of input transformation tools (410). Drawer demand tool (402) and CP inventory tool provide drawer demand data and inventory data, respectively, to the set of input transformation tools (410).

As shown, the set of input transformation tools (410) may be implemented as a collection of individual tools, including a drawer build plan (DBP) tool (412), an inventory management plan (IMP) tool (414), and a DDC selection tool (416). It is to be understood that the arrangement of tools (412)-(416) of the set (410) is purely exemplary, and it is to be appreciated that the set (410) may be implemented in alternate embodiments as a single tool, as a collection of individual tools, or as a combination of one or more tools.

At the drawer production stage, each drawer is individually built before being moved to a testing stage. To determine the order of production of each drawer, a drawer build plan is constructed prior to the commencement of production. DBP tool (412) is shown in communication with drawer demand tool (402). In one embodiment, DBP tool (412) receives drawer demand data from drawer demand tool (402), and generates a build plan list based on the received drawer demand data. A process for constructing an exemplary build plan list will be described in further detail below with reference to FIG. 8.

IMP tool (414) is configured to shape inventory to minimize the possibility of an inventory crisis, such as a possible inventory shortage. IMP tool (414) is shown in communication with CP inventory tool (404). In one embodiment, IMP tool (414) receives a collection of data, including inventory data from CP inventory tool (404), and shapes the inventory based on the received data. The collection of data may include, but is not limited to, current inventory, future inventory mix, future demand, and alternative parts usage. In one embodiment, IMP tool (414) generates a set of inventory scenarios based on the received collection of data. Inventory may be further shaped based on factors affecting inventory, such as component testing. The inventory shaping process will be described in further detail below with reference to FIG. 9.

DDC selection tool (416) is configured to select a DDC for a build plan, while taking inventory into account. In one embodiment, the DDC selection tool (416) receives the following: a generated build plan list, a set of inventory scenarios from the database, and a generated DDC list (420). The DDC selection tool (416) performs a comparison utilizing the received data, and generates a set of eligible DDCs based on the comparison (422), which in one embodiment is forwarded to an associated drawer configuration dashboard. From the set of eligible DDCs, the DDC selection tool (416) may select an eligible DDC from the set based on one or more constraints. Specifically, the DDC selected by the DDC selection tool (416) is determined to be an efficient and eligible configuration for the build plan. In one embodiment, the one or more constraints may include selecting an eligible DDC having the lowest weight. In other words, the DDC selection tool (416) may select an eligible DDC having the fewest number of components from the set of eligible DDCs. The process performed by the DDC selection tool (416) will be described in further detail below with reference to FIG. 11.

Figure 5:
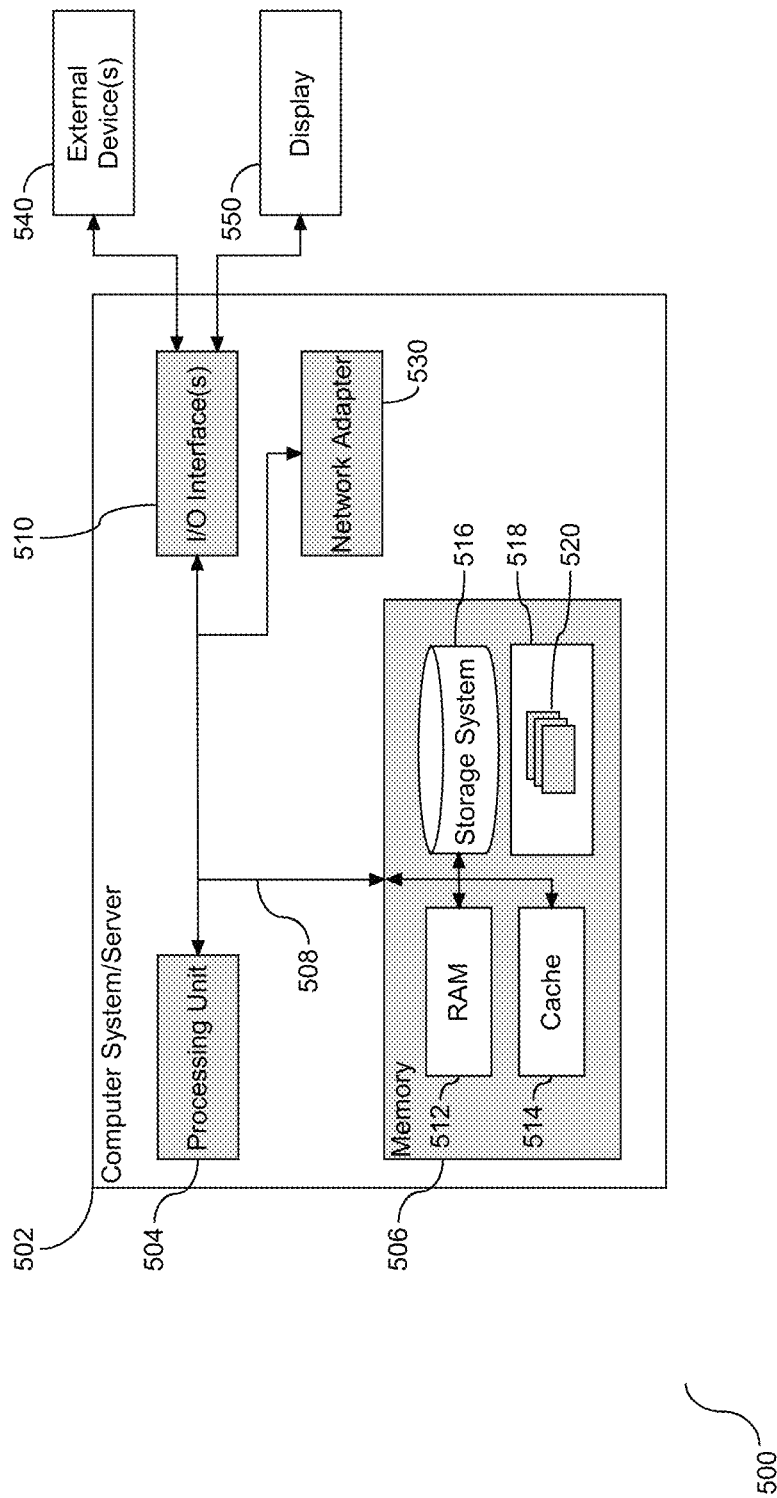
FIG. 5 depicts a block diagram of a computer system, according to an embodiment.

With reference to FIG. 5, a block diagram (500) is provided illustrating an example of a computer system/server (502). In one embodiment, the computer system/server (502) is a transmission server (502). Transmission server (502) is operational with numerous other general purpose or special purpose computing system environments or configurations. Examples of well-known computing systems, environments, and/or configurations that may be suitable for use with transmission server (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Transmission server (502) may be described in the general context of computer system-executable instructions, such as program modules, being executed by a computer system. Generally, program modules may include routines, programs, objects, components, logic, data structures, and so on that perform particular tasks or implement particular abstract data types. Transmission server (502) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the transmission server (502) is shown in the form of a general-purpose computing device. The components of the transmission server (502) may include one or more processors, shown as processing unit (504). In one embodiment, the processing unit (504) includes a microprocessor. The components of the transmission server (502) may further include, but are not limited to, a system memory (506), and a bus (508) that couples various system components including system memory (506) to processing unit (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The transmission server (502) typically includes a variety of computer system readable media. Such media may be any available media that is accessible by transmission server (502) and it includes both volatile and non-volatile media, removable and non-removable media.

Memory (506) can include computer system readable media in the form of volatile memory, such as random access memory (RAM) (512) and/or cache memory (514). The transmission server (502) further includes other removable/non-removable, volatile/non-volatile computer system storage media. By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces. As will be further depicted and described below, memory (506) may include at least one program product having a set (e.g., at least one) of program modules that are configured to carry out the functions of the embodiments described herein.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) may comprise one or more tools for generally carrying out the functions and/or methodologies of embodiments as described herein.

For example, the set of program modules (520) may include dynamic drawer configuration plans tools as described above with reference to FIG. 4, such as the Drawer Build Plan (DPB) tool, the Inventory Management Plan (IMP) tool, and the Drawer Design Configuration (DDC) Selection tool. In one embodiment, the processing unit (504) executes the Drawer Build Plan tool to generate a drawer build plan list, the IMP tool to generate one or more inventory scenarios, and the DDC Selection tool to select a DDC for assignment to each drawer of a build plan based on the inventory scenarios. This allows the build design to be visually displayed on the computer. In one embodiment, the computer receiving the transmitted build design is the remote subscriber computer. However, the computer receiving the build design may be any computer designated by the destination address provided to the transmission server (502) by the remote subscriber computer. The processes performed by the DPB tool, the IMP tool, and the DDC Selection tool will be discussed in further detail below with respect to FIGS. 8-10, respectively.

The transmission server (502) may communicate with one or more external devices (540), such as a keyboard, a pointing device, etc.; a display (550); one or more devices that enable a user to interact with the transmission server (502); and/or any devices (e.g., network card, modem, etc.) that enable the transmission server (502) to communicate with one or more other computing devices.

In one embodiment, the external devices (540) include a remote subscriber computing device, or remote subscriber computer, and a secondary computer. A drawer build plan application installed on the remote subscriber computer is a source of remote subscriber information. The remote subscriber information may include, but is not limited to, one or more datasets associated with inventory supply and drawer demand, and a destination address to establish a connection to the secondary external computer. In one embodiment, the drawer build plan application is in communication with the scheduled batch run tools as described above with reference to FIG. 2 to generate at least a portion of the remote subscriber information.

The remote subscriber information is transmitted or otherwise sent from the remote subscriber computer, and is received by transmission server (502) for storage in the memory (506). In one embodiment, the transmission server (502) establishes a connection with the remote subscriber computer for the transmission of the remote subscriber information. Program modules (520) are configured to generate and select one or more DDCs from the dataset portion of the remote subscriber information stored in the memory (506). In one embodiment, the destination address portion of the remote subscriber information is used to establish a connection between the transmission server (502) and the secondary computer. The DDC selection(s) are transmitted to the secondary computer for viewing. The secondary computer may be the remote subscriber computer, or may be a separate computing device. In one embodiment, the DDC selections(s) are further transmitted to the display (550) for viewing.

Communication between the external devices (540) and display (550) can occur via Input/Output (I/O) interface(s) (510). Still yet, the transmission server (502) can communicate with one or more networks such as a local area network (LAN), a general wide area network (WAN), and/or a public network (e.g., the Internet) via network adapter (530). As depicted, network adapter (530) communicates with the other components of transmission server (502) via bus (508). In one embodiment, the remote subscriber information (e.g., the received drawer build plan dataset and the destination address) may be received by the transmission server (502) via the network adapter (530), and then communicated by the network adapter (530) to memory (506) via bus (508) for storage. It should be understood that although not shown, other hardware and/or software components could be used in conjunction with transmission server (502). Examples, include, but are not limited to: microcode, device drivers, redundant processing units, external disk drive arrays, RAID systems, tape drives, and data archival storage systems, etc. In one embodiment, the causes the build design to be visually displayed on the computer (550).

In one embodiment, transmission server (502) may be implemented as a node in a cloud computing network. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
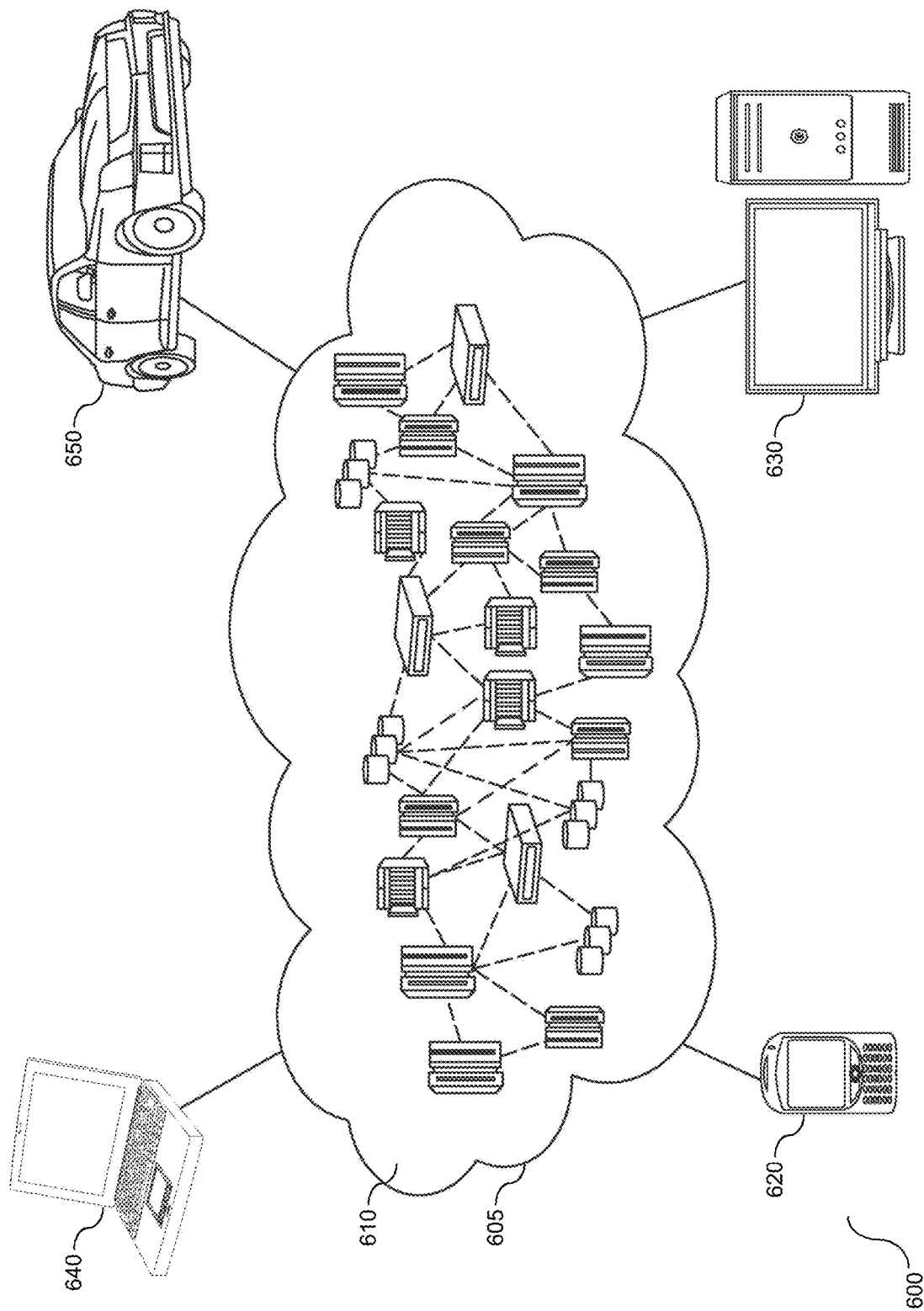
FIG. 6 depicts a block diagram illustrative of a cloud computing environment, according to an embodiment.

Referring now to FIG. 6, a diagram (600) of an illustrative cloud computing environment (605) is depicted. As shown, cloud computing environment (605) includes one or more cloud computing nodes (610) with which local computing devices used by cloud consumers may communicate. Examples of these local computing devices include, but are not limited to, personal digital assistant (PDA) or cellular telephone (620), desktop computer (630), laptop computer (640), and/or automobile computer system (650). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (620)-(650) shown in FIG. 6 are intended to be illustrative only and that computing nodes (610) and cloud computing environment (605) can communicate with any type of computerized device over any type of network and/or network addressable connection (e.g., using a web browser).

Figure 7:
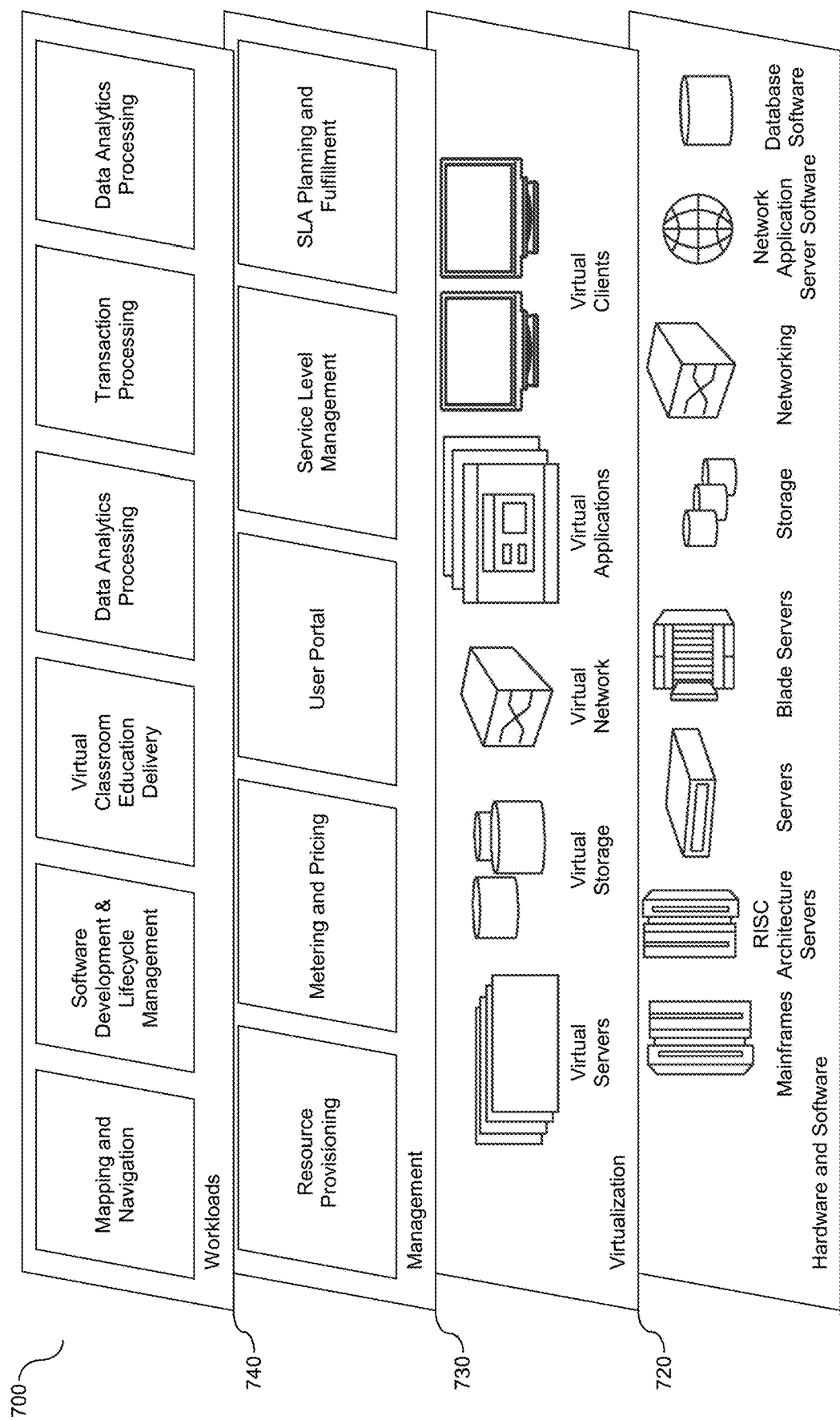
FIG. 7 depicts a block diagram illustrating a set of functional abstraction model layers provided by the cloud computing environment, according to an embodiment.

Referring now to FIG. 7, a set of functional abstraction layers provided by cloud computing environment (700) is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and grammatical pattern organization support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions.

Figure 8:
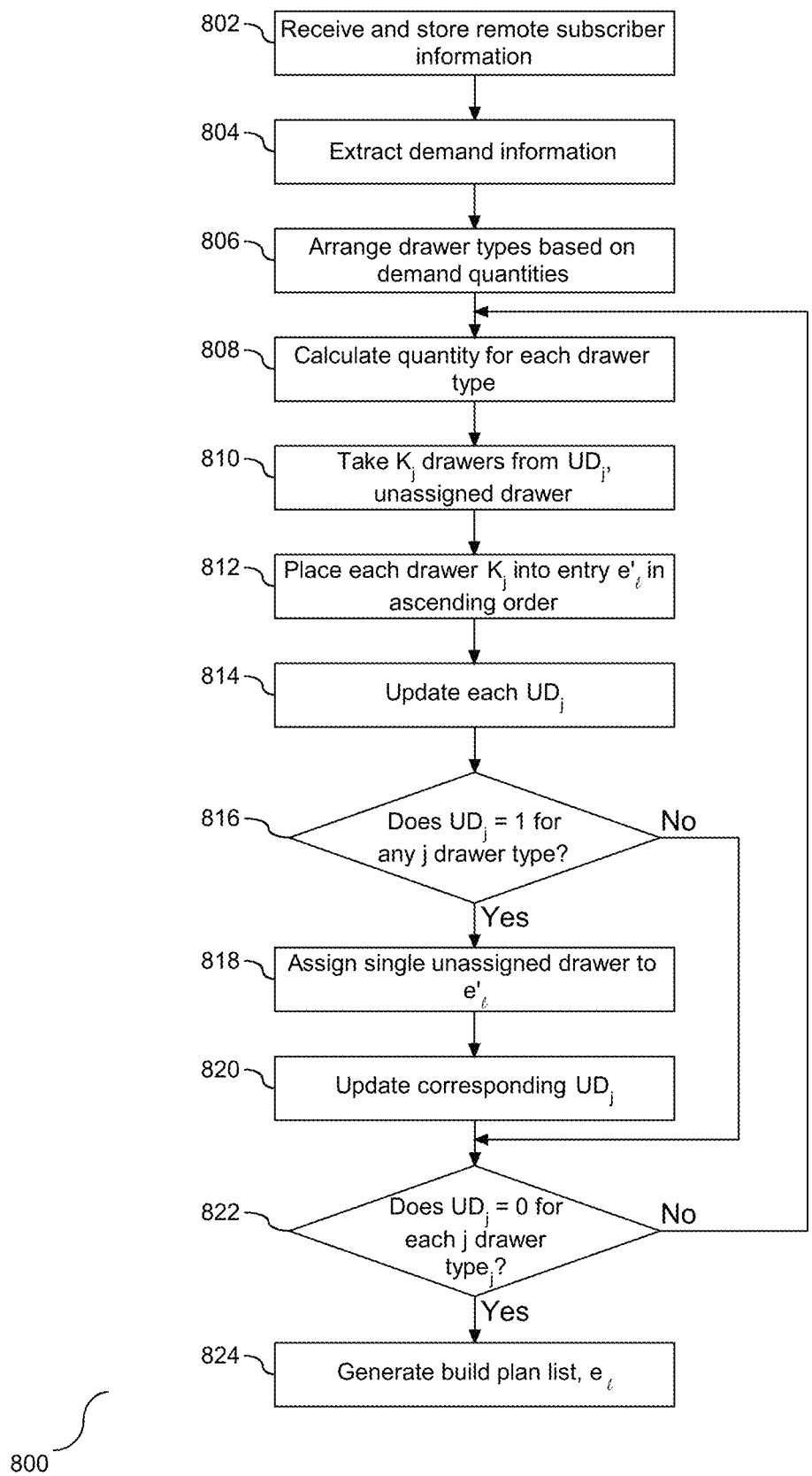
FIG. 8 depicts a flowchart illustrating a process for generating server drawer build plans, according to an embodiment.

With reference to FIG. 8, a flowchart (800) is provided illustrating a process for creating a drawer build plan list, $e_l$. A transmission server receives and stores remote subscriber information (802). In one embodiment, the information received at step (802) includes drawer demand data output from an application installed on a remote subscriber computer. The received drawer demand data may be embodied in one or more dataset(s), as described above with reference to FIGS. 2 and 3.

Demand information associated with a set of drawer types is extracted from the dataset(s) (804). In one embodiment the set of drawer types includes 39-way and 42-way drawer types, and the demand information is associated with a demand quantity for each drawer type. As an illustrative example, assume that j=1 corresponds to the 39-way drawer type, j=2 corresponds to the 42-way drawer type, the demand quantity of 39-way drawer types is $D_1=2$, and the demand quantity of 42-way drawer types is $D_2=5$, meaning that there is a total demand for 7 drawers. The drawer types are arranged in order based on their respective demand quantities (806). In one embodiment, the drawer types are arranged in ascending order based on the demand quantities. In the illustrative example, since $D_1=2$ and $D_2=5$, the 39-way drawer type is arranged above the 42-way drawer type.

$D_1$ and $D_2$ may each be viewed as an initial unassigned quantity of drawers, $UD_1$ and $UD_2$, respectively. A quantity of each drawer type to be assigned, $K_j$, is calculated (808). In one embodiment, $K_j=UD_j/\min(UD_j|UD_j>0)$, for all j, rounded up to the nearest integer. For example, since $D_1<D_2$, each demand quantity is divided by $D_1$. Accordingly, in this example, the initial values of $K_j$ are $K_1=1$ and $K_2=3$.

$K_j$ drawers are taken from each respective $UD_j$ (810), and each taken drawer is placed into a respective entry of $e'_l$ in ascending order (812). In one embodiment, the placement of each drawer in $e'_l$ is in ascending order based on each $K_j$ value. That is, in the illustrative example, since $K_1=1$ and $K_2=3$, one 39-way drawer is assigned in the first entry of $e'_l$, and one 42-way drawer is assigned in each of the subsequent three entries of $e'_l$. Accordingly, the first four of the seven total entries of $e'_l$ are represented by 39-42-42-42.

Each $UD_j$ value is updated in response to the assignment (814). In one embodiment, the update at step (814) includes subtracting $K_j$ from $UD_j$. For example, since $K_1=1$ and $K_2=3$, the updated $UD_1=1$, and the updated $UD_2=2$.

In response to the update at step (814), it is determined if $UD_j=1$, for any of the j drawer types (816). An affirmative response to the determination at step (816) results in the assignment of the single unassigned drawer to $e'_l$ (818), and the corresponding $UD_j$ is updated (820). It is then determined if there are any remaining unassigned drawers to assign to $e'_l$ (822). In other words, step (822) determines if $UD_j=0$, for each drawer type j. A non-affirmative response to the determination at step (816) causes the process to proceed to step (822).

A non-affirmative response to the determination at step (822) means that there are unassigned drawers remaining, and causes the process to revert back to step (808) to assign the remaining drawers. An affirmative response to the determination at step (822) signifies that the assignment of drawers to $e'_l$ is completed, and a build plan list, $e_l$, is generated (824). In one embodiment, generating $e_l$ at step (826) includes reversing the order of the entries of $e'_l$. In other words, $e_l$ is a mirror image of $e'_l$. Accordingly, a build plan list for drawers is constructed based on demand quantities of each drawer type.

Steps (814)-(824) described above will now be applied to the illustrative example with the updated $UD_1=1$, and the updated $UD_2=2$. After the update at step (814), $UD_1=1$. Hence, the process proceeds to step (816). The single remaining unassigned 39-way drawer is assigned to the fifth slot of $e'_l$ at step (818), and $UD_1$ is updated to equal zero at step (820). However, since $UD_2=2$, it is determined at step (822) that there are unassigned drawers remaining, and the process reverts back to step (808) to divide $UD_2$ by the lowest unassigned demand quantity remaining. In this example, since there are only 42-way drawers left to be assigned, $UD_2$ is divided by itself. Thus, $K_{42}$ is updated at step (810) to equal one. The one 42-way drawer is assigned to the sixth slot of $e'_l$ at step (812). The revised quantity of unassigned drawers is updated at step (814), such that $UD_2$ is updated to equal one (i.e., $UD_2=2-1=1$). The process returns to step (818) via the determination made at step (816) to assign the single remaining unassigned 42-way drawer to the seventh and final slot of $e'_l$, and the value of $UD_2$ is updated at step (820) to equal zero. The process proceeds to step (824) via step (822) to generate $e_l$ since there are no more drawers left to assign to $e'_l$. Accordingly, since $e'_l$ is ordered as 39-42-42-42-39-42-42, $e_l$ is ordered at step (824) as 42-42-39-42-42-42-39.

In one embodiment, $e_l$ designates a sequence of batch orders of server drawers to produce a server. In other words, the sequence determines the order in which the drawers of the build plan should be built. Accordingly, $e_l$ is generated to schedule orders proportionally based on a demand quantity for each drawer type.

Figure 9:
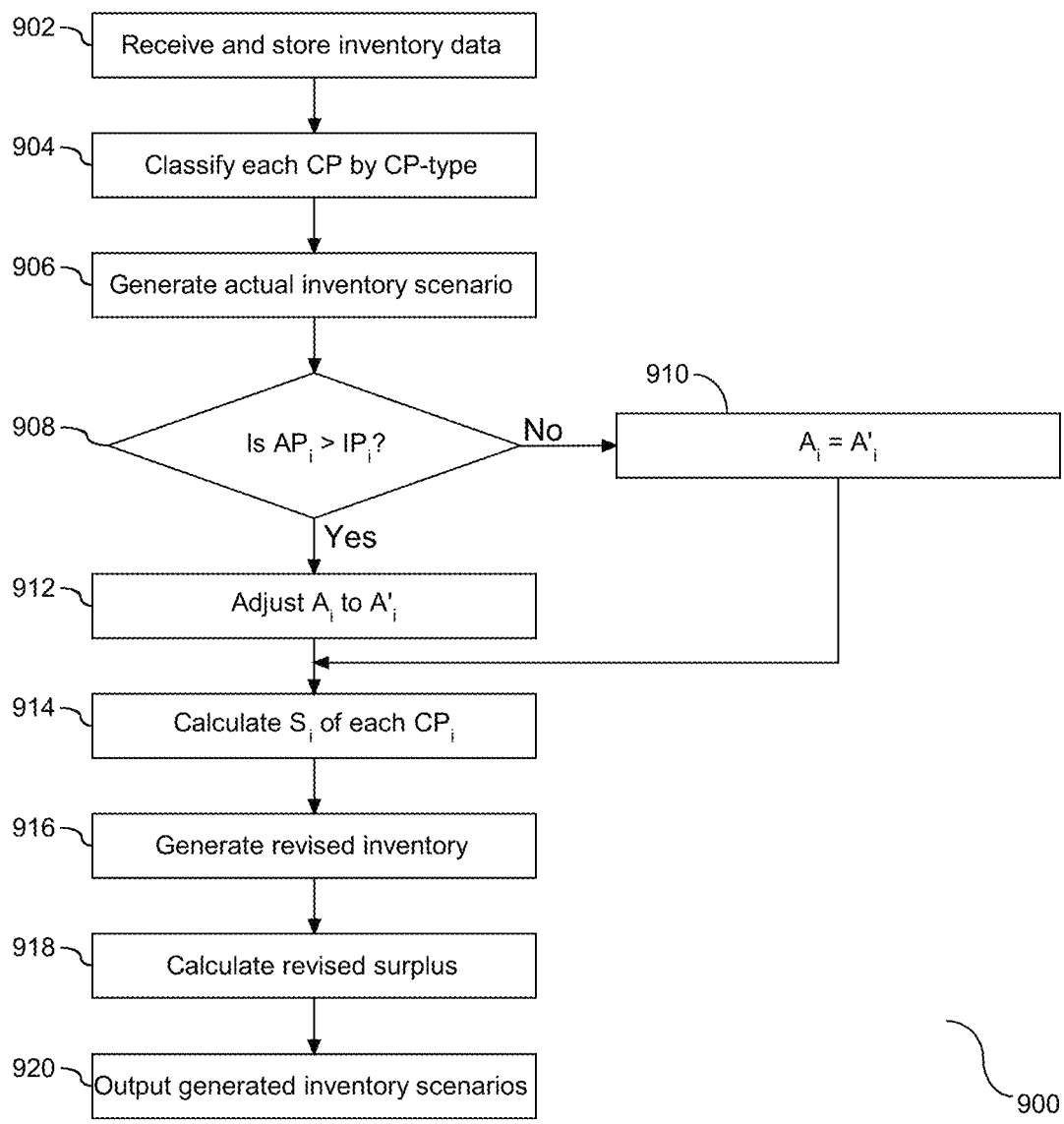
FIG. 9 depicts a flowchart illustrating a process for generating drawer component inventory scenarios and dynamically managing drawer component inventory, according to an embodiment.

With reference to FIG. 9, a flowchart (900) is provided illustrating a process for generating drawer component inventory scenarios and dynamically managing drawer component inventory. A transmission server receives and stores inventory data (902). In one embodiment, the received inventory data is embodied in one or more dataset(s), as described above with reference to FIG. 2. The inventory data may include, for example, inventory metrics associated with drawer component inventory type and quantity. In one embodiment, the inventory metrics include measurements associated with CP inventory. For example, the inventory metrics may include an actual inventory, a forecasted inventory, and a forecasted demand.

Each CP in the inventory is classified by CP-type (904). As previously discussed, each CP has a CP-type that describes a performance level of the CP, and the number of cores of the CP. For example, a high performance CP having 8 cores may be designated as 8H. Generally speaking, there will be N total CP-types classified within the CP inventory, and an individual CP-type will be referred to herein as $CP_i$. In one embodiment, the classification at step (904) includes assigning each of the N CP types to a respective i value. For example, the 8H type may be assigned to i=1, and the 8L type may be assigned to i=2.

An actual inventory scenario for each $CP_i$ is generated based on the actual inventory metric (906). The actual inventory scenario reflects an inventory of all each $CP_i$, and excludes work-in-progress (WIP) and in-test inventory. In other words, the actual inventory scenario reflects the "on hand" inventory. In one embodiment, the generated actual inventory scenario includes an actual inventory quantity for each $CP_i$, $A_i$, and a percentage of the total inventory for each $CP_i$, $AP_i$. Moreover, the total inventory may be calculated as $\Sigma A_i$. For example, for a given CP type i, if $A_i$=10 and $\Sigma A_i$=100, then $AP_i$=10%.

The future supply level of CPs may be inconsistent due to, for example, variability with respect to CP production processes. To ensure that there is a sufficient supply of CPs to accommodate such inconsistencies, an adjusted inventory scenario may be generated for each $CP_i$ based on the forecasted inventory metric, as described below.

In one embodiment, the forecasted inventory metric is in the form of a percentage of incoming inventory, $IP_i$, for each $CP_i$. Each $AP_i$ is compared to its respective $IP_i$ to determine if the $AP_i$ is greater than the $IP_i$ (908). The comparison at step (908) is performed in order to determine if the current inventory level for a $CP_i$ needs to be adjusted to accommodate a potential future supply shortage with respect to the $CP_i$. If the comparison at step (908) determines that the $AP_i$ is not greater than $IP_i$, then $A_i$ need not be modified, and the adjusted inventory quantity $A'_{ti}=A_i$ (910). However, if the comparison at step (908) determines that the $AP_i$ is greater than the $IP_i$, then a portion of the current inventory of $CP_i$ needs to be set aside, and an adjustment to $A_i$ is subsequently made (912). In one embodiment, step (912) includes calculating the adjusted inventory $$A'_i \text{ as } A_i \times \frac{IP_i}{AP_i},$$

rounded up. For example, if $CP_i$ has $A_i$=10, $AP_i$=5%, and $IP_i$=5%, then $A'_i=A_i$=10. However, if $AP_i$=8%, and $IP_i$=4%, then $$A'_i = A_{8H} \times \frac{IP_{8H}}{AP_{8H}} = 10 \times \frac{4}{8} = 5.$$

A surplus quantity $S_i$ of each $CP_i$ is calculated (914). In one embodiment, $S_i=A_i-A'_i$. Accordingly, an adjusted inventory scenario is generated for the N CP-types that includes each $A'_i$, and a surplus quantity is derived from the adjusted inventory scenario.

Another factor to consider with respect to inventory is the ability of the current inventory to meet future drawer demand, while simultaneously addressing current drawer demand needs. A revised inventory scenario is generated (916) based on future drawer demand. In one embodiment, generating the revised inventory scenario at step (916) includes calculating a revised inventory quantity for each $CP_i$, $R_i$, as max($A'_i-QS_i+QR_i$, 0), where $QS_i$ is quantity surplus and $QR_i$ is the amount of inventory required to replenish the $QS_i$ amount to meet current demand. In one embodiment, a revised surplus for each component, $RS_i$, is calculated (918). For example, $RS_i$ may be calculated as $S_i+QS_i-QR_i$. The generated inventory scenarios are output (920). The generated inventory scenarios may be output as a table, as discussed above with reference to FIG. 2.

$QS_i$ may be determined based on future drawer demand quantities that need to be fulfilled by the current inventory level of each CP-type. In one embodiment, $QS_i$ of each $CP_i$ of the j-th drawer type is calculated as $QS_i = \Sigma_j P_j \times DC_{j1i}$, where $P_j$ represents the future demand quantities of the j-th drawer type that need to be fulfilled from the current inventory, and $DC_{jki}$ represents the quantity of $CP_i$ of a j-th drawer type of the k-th drawer design configuration (e.g., k=1 may designate the primary configuration for the drawer type). $P_j$ may be computed as $F_j \times \alpha_j$, where $F_j$ is the total drawer demand quantity for the j-th drawer type, and $\alpha_j$ is a percentage of the future drawer demand that needs to be fulfilled for the j-th drawer type. An example of the calculation of $QS_i$ is provided below with reference to FIG. 10. The quantity replenished, $QR_i$ may be determined based on analyzing the surplus inventory corresponding to the alternative configurations. An example of the calculation of $QR_i$ is provided below with reference to FIG. 11.

FIG. 10 depicts a table (1000) illustrating an exemplary calculation of $QS_i$. In this example, it is assumed that (1) j=1 corresponds to the 39-way drawer type and j=2 corresponds to the 42-way drawer type; (2) $F_1$=10 and $\alpha_1$=20%, meaning that $P_1$=2; and (3) $F_2$=6 and $\alpha_2$=20%, meaning that $P_2$=1.

As shown, column (1002) represents each of the i CP-types that may be used in constructing a drawer. As previously discussed, there are 9 total CP-types that may be used, and each row (1020)-(1036) corresponds to data associated with a respective $CP_i$. For example, row (1028) corresponds to i=5, which is associated with the 7M CP-type. Column (1004) contains each quantity of $DC_{jki}$ corresponding to the primary configuration of the drawer type j=1 for each of the i CP-types, and column (1006) contains each quantity of $DC_{jki}$ corresponding to the primary configuration of the drawer type j=2 for each of the i CP-types. For example, and as shown, there are 3 $CP_5$ components in the primary configuration of the 39-way drawer type, and 4 $CP_5$ components in the primary configuration of the 42-way drawer type.

Column (1008) represents the product of $P_1$ with each of the $DC_{11i}$ quantities, and column (1010) represents the product of $P_2$ with each of the $DC_{21i}$ quantities. As shown with respect to $CP_5$, $P_1 \times DC_{115}$=6 (i.e., 2×3=6), and $P_2 \times DC_{215}$=4 (i.e., 1×4=4). The quantities of columns (1008) and (1010) are summed with respect to each $CP_i$ to determine $QS_i$. As shown with respect to $CP_5$, $QS_5$=6+4=10.

Figure 11:
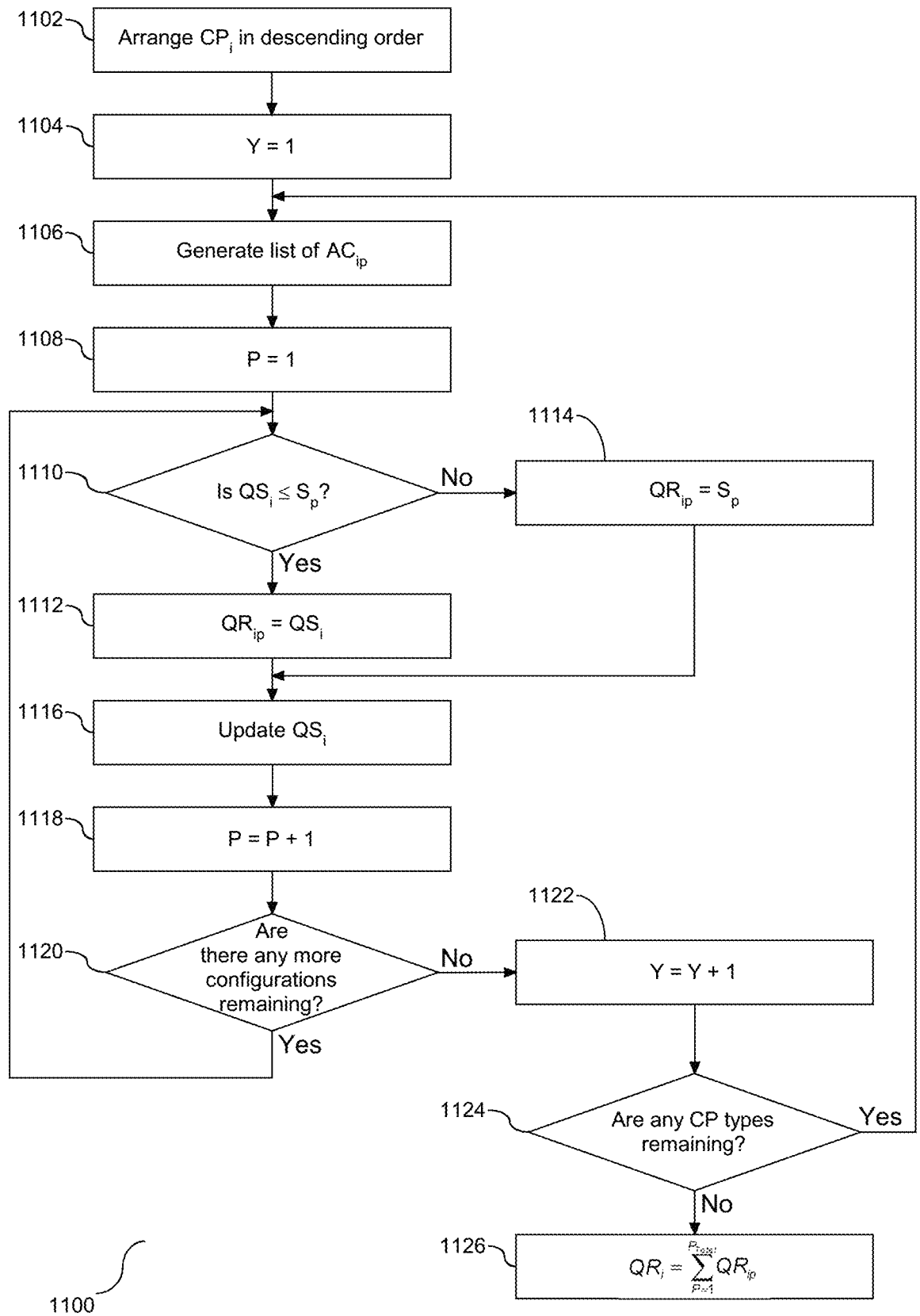
FIG. 11 depicts a flowchart illustrating an exemplary process for performing a quantity replenished calculation of drawer component inventory, according to an embodiment.

An exemplary process for calculating $QR_i$ will now be described with reference to FIG. 11. FIG. 11 depicts flowchart illustrating a process for calculating $QR_i$. Each $CP_i$ is arranged in descending $QS_i$ order (1102). A counter Y is initialized (1104), which represents the order of the arranged CP types. For example, Y=1 corresponds to the i-th CP type having the highest quantity surplus. A list of $P_Y$ total alternative configuration parts, $AC_{ip}$, is generated for Y (1106). $AC_{ip}$ represents a p-th alternative configuration for the i-th CP-type corresponding to Y, with each $AC_{ip}$ having a corresponding p-th alternative configuration surplus quantity, $S_p$. A counter p is initialized (1108). $QS_i$ is compared to $S_p$ to determine if $QS_i$ is less than or equal to $S_p$ (1110). An affirmative response to the determination at step (1110) results in setting $QR_{ip}=QS_i$ (1112). A non-affirmative response to the determination at step (1110) results in setting $QR_{ip}=S_p$ (1114).

Following either steps (1112) or (1114), the corresponding $QS_i$ is updated by subtracting the $QS_i$ from the corresponding $QR_{ip}$ (1116). The counter p is updated (1118), and it is determined if there are any alternative configurations remaining for the current CP-type corresponding to Y (1120). An affirmative response to the determination at step (1120) causes the process to revert back to step (1110). A non-affirmative response to the determination at step (1120) means that each alternative configuration has been accounted for. The counter Y is updated (1122), and it is determined if there are any CP-types remaining (1124). An affirmative response to the determination at step (1124) causes the process to revert back to step (1106) to generate a list of alternative configuration parts for the next CP-type having the next highest $QS_i$. A non-affirmative response to the determination at step (1124) means that each CP-type has been accounted for. $QR_i$ may then be calculated for each $CP_i$ by summing each $QR_{ip}$ (1126).

Figure 12A:
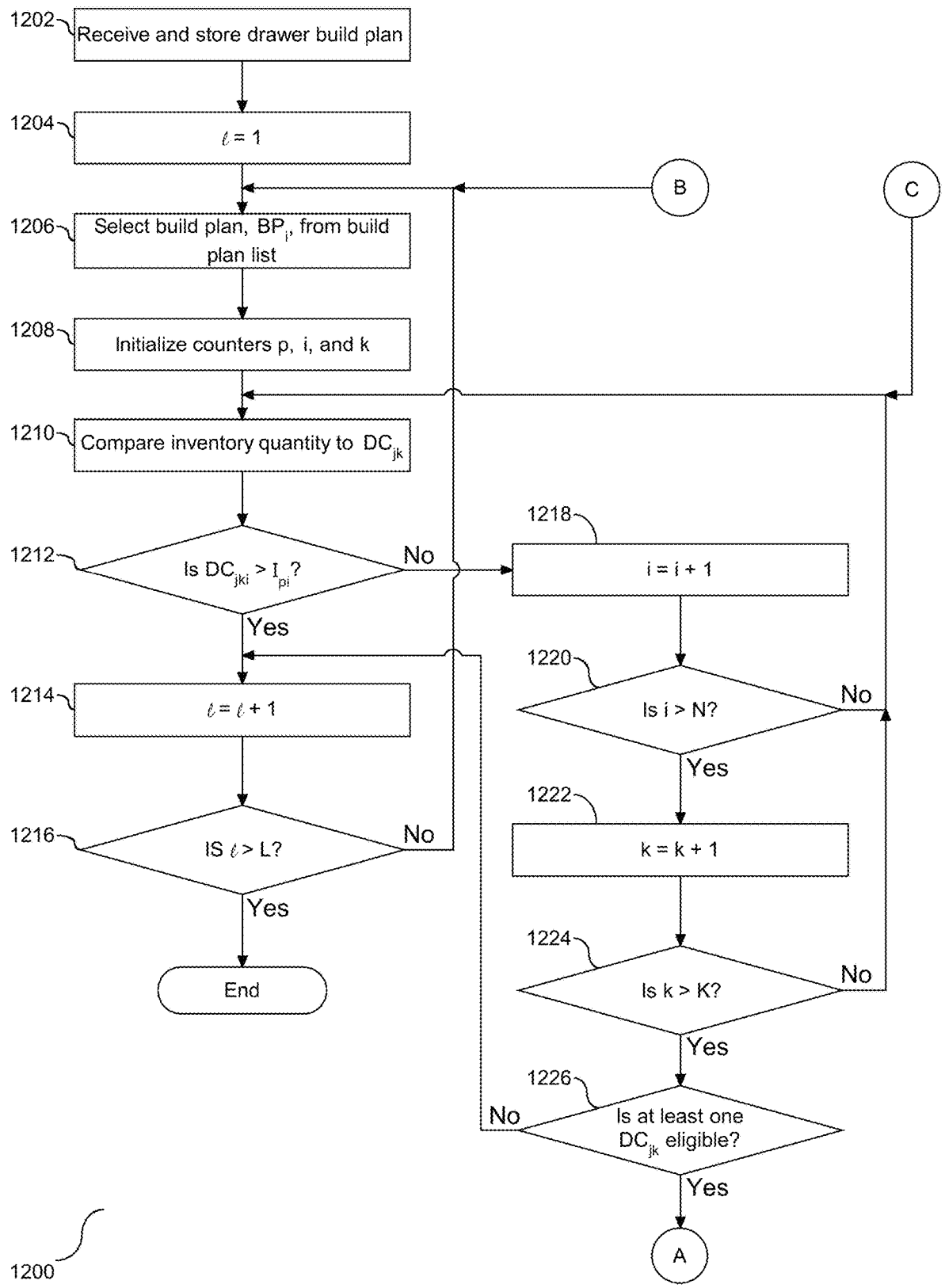
FIGS. 12A and 12B depict a flowchart illustrating a process for selecting a drawer design configuration from a drawer design configuration list, according to an embodiment.
Figure 12B:
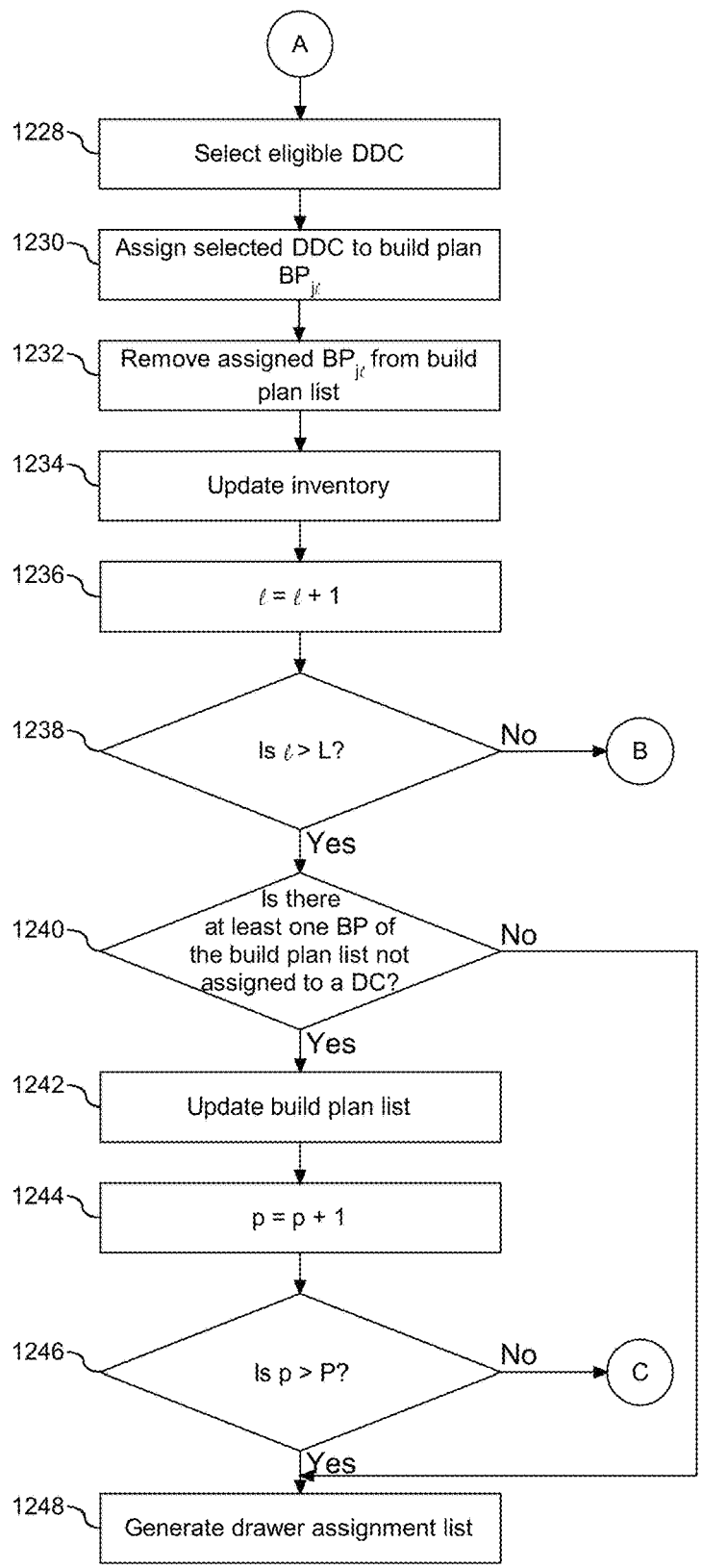

With reference to FIGS. 12A and 12B, a flowchart (1200) is provided illustrating a process for selecting a DDC from a list of DDCs. A drawer build plan list is received and stored (1202). In one embodiment, the build plan list is generated by the process described above with reference to FIG. 8, and may be received from the DBP tool, as discussed above with reference to FIG. 4.

A counter l is initialized (1204), and a build plan $BP_{jl}$ is selected from the build plan list (1206). In one embodiment, and as previously discussed, the build plan list is organized in a sequential order. The counter l represents the position of the build plan in the build plan list. For example, the first build plan of the list is $BP_{j1}$. The variable j represents the drawer type. In one embodiment, j=1 corresponds to the 39-way drawer type, and j=42 corresponds to the 42-way drawer type. For example, if the first build plan selected at step (1206) is a 42-way drawer type, then $BP_{j1}=BP_{21}$. In one embodiment, the total quantity of positions in the build plan list, L, is seven.

Counters p, i, and k are initialized (1208). The counter p corresponds to a p-th inventory scenario of P total inventory scenarios, the counter i corresponds to an i-th CP-type of N total CP-types, and the counter k corresponds to a k-th DDC of a DDC list of K total DDCs. $DC_{jk}$ corresponds to a k-th DDC for the drawer type j associated with the selected build plan.

In one embodiment, there are P=3 total inventory scenarios, where p=1 corresponds to the revised inventory scenario, p=2 corresponds to the adjusted inventory scenario, and p=3 corresponds to the actual inventory scenario. In this embodiment, $I_{1i}$ is the revised inventory quantity $R_i$, $I_{2i}$ is the adjusted inventory quantity $A'_i$, and $I_{3i}$ is the actual inventory quantity $A_i$.

The inventory quantity $I_{pi}$ is compared to $DC_{jk}$ (1210). In one embodiment, the comparison at step (1210) includes comparing the $CP_i$ quantity within $DC_{jk}$ ($DC_{jki}$) with $I_{pi}$. It is determined if $DC_{jki}$ exceeds $I_{pi}$ (1212). In one embodiment, the determination at step (1212) includes determining if a ratio of $DC_{jki}:I_{pi}>1$. An affirmative response to the determination at step (1212) means that that $BP_{jl}$ cannot currently be built. The counter l is updated (1214), and it is determined if l>L (1216). An affirmative response to the determination at step (1216) means that there are no more build plans left in the build plan list for DDC selection, and the process ends. A non-affirmative response to the determination at step (1216) causes the process to revert back to step (1206) to select the next build plan.

A non-affirmative response to the determination at step (1212) causes the process to update the counter i (1218), and it is determined if i>N (1220). A non-affirmative response to the determination at step (1220) causes the process to revert back to step (1210). An affirmative response to the determination at step (1220) means that each $CP_i$ of $DC_{jk}$ has been accounted for and that $DC_{jk}$ has passed for $BP_{jl}$. The counter k is updated (1222), and it is determined if k>K (1224). A non-affirmative response to the determination at step (1224) causes the process to revert back to step (1210) to compare the next $DC_{jk}$ with $BP_{jl}$. An affirmative response to the determination at step (1224) means that each $DC_{jk}$ has been accounted for, and it is determined if there is at least one $DC_{jk}$ that is eligible (1226). Accordingly, the process analyzes each DDC of the DDC list to determine DDC eligibility.

A non-affirmative response to the determination at step (1226) means that there are no eligible DDCs for $BP_{jl}$ with $I_p$, and the process reverts back to step (1214) to update the counter l. An affirmative response to the determination at step (1226) indicates that there is at least one eligible DDC that can satisfy the constraint imposed by $I_p$, and an eligible DDC is selected based on the CP count (1228). As previously discussed, each DDC has a CP count at least equal to the drawer type associated with the DDC. For example, if a DDC is for a 39-way drawer type, then it must have a CP count of at least 39, and if a DDC is for a 42-way drawer type, then it must have a CP count of at least 42. In one embodiment, the selection at step (1228) includes determining a weight of each eligible DDC, and selecting the eligible DDC associated with the lowest weight. Accordingly, CP count acts as an additional constraint in the selection of a DDC.

The selected DDC is assigned to the build plan $BP_{jl}$ (1230). In response to the assignment, the assigned $BP_{jl}$ is removed from the build plan list (1232), and $I_p$ is updated to reflect the assignment (1234). The counting variable l is updated (1236), and it is determined if l>L (1238). A non-affirmative response to the determination at step (1238) causes the process to revert back to step (1206) to select the next build plan in the build plan list. An affirmative response to the determination at step (1238) causes the process to determine if there is at least one $BP_{jl}$ of the build plan list that has yet to be assigned a respective $DC_{jk}$ (1240).

An affirmative response to the determination at step (1240) causes the process to update the build plan list with each unassigned $BP_{jl}$ in ascending order (1242), update the counter p (1244), and determine if p>P (1246). A non-affirmative response to the determination at step (1246) causes the process to revert back to step (1210) to determine if a DDC can be assigned based on the next applied inventory scenario. For example, if a DDC that meets drawer demand cannot be found based on the revised inventory scenario, it is determined if there is a DDC that meets drawer demand based on the adjusted inventory scenario. Moreover, if a DDC that meets drawer demand cannot be found based on the adjusted inventory scenario, it is determined if there is a DDC that meets drawer demand based on the actual inventory scenario. Accordingly, the inventory scenarios are applied in a prioritized hierarchical fashion to find a DDC for a given build plan.

An affirmative response to the determination at step (1246) causes the process to generate a drawer assignment list $d_l$ (1248). In one embodiment, the drawer assignment list includes, for example, each build plan of the build plan list with its assigned DDC, and a status associated with each inventory scenario. A non-affirmative response to the determination at step (1240) means that every $BP_{jl}$ has been assigned a respective $DC_{jk}$, and $d_l$ is generated at (1248). Accordingly, DDCs are selected for each build plan of a build plan list based on one or more based on quantities associated with an inventory scenario assigned to the build plan.

In one embodiment, generating the drawer assignment list at step (1248) includes transmitting a real-time web report to a manufacturing site. In one embodiment, the web report presents each build plan of the build plan list with its assigned DDC, and instructions for building each build plan at the manufacturing site. For example, the instructions may include respective illustrations depicting how to plug in the SCMs in each respective drawer. Each DDC in the web report may be represented by a unique DDC identification number. Accordingly, the web report includes information to allow the manufacturing site to commence drawer production based on the build plans and drawer design configurations described in the transmitted web report.

In one embodiment, a processing device of a computer system, such as a microprocessor of a transmission server, is configured to perform the processes described above with reference to FIGS. 8-12. For example, the transmission server may be in communication with the tools described above with reference to FIGS. 2-5 to generate a server drawer build plan, generate drawer component inventory scenarios, dynamically manage drawer component inventory, and select a drawer design configuration based on the drawer build plan and the inventory scenarios. Accordingly, the systems described above with reference to FIGS. 2-5 may be configured to perform the processes described above with reference to FIGS. 8-12.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A system to configure server drawer build plans over a network to a remote subscriber computer, the system comprising:

a first computer in communication with a processor, the first computer having an installed application, wherein the application outputs data associated with a data source of the first computer, and wherein the output data comprises demand data and inventory data; and a transmission server in communication with the first computer, the transmission server to receive the output data over a network connection, wherein the transmission server comprises memory for storing remote subscriber information, wherein the remote subscriber information comprises the received data and a destination address associated with a second computer, and wherein the transmission server comprises a processing device to:

generate a drawer build plan list comprising one or more drawer build plans based on the received dataset;

generate one or more inventory scenarios based on one or more inventory metrics associated with drawer components, wherein the drawer components comprise system controllers and central processors;

choose at least one drawer build plan from the drawer build plan list;

compare a plurality of drawer design configurations to at least one of the one or more inventory scenarios to produce a set of eligible drawer design configurations, wherein each drawer design configuration corresponds to a respective arrangement of the central processors by core number and performance level within slots of a drawer type of a respective chosen build plan;

select a drawer design configuration from the set of eligible drawer design configurations for one or more respective drawer build plans based on one or more constraints;

construct a list of one or more build plans based on demand data and the selected drawer design configuration; and establish a connection to the second computer via the destination address, including transmit the constructed list to generate a build plan at a manufacturing site; and manufacture a drawer for fulfilling an order based on the build plan generated at the manufacturing site.

2. The system of claim 1, wherein the demand data reflects one or more demand quantities associated with one or more respective drawer build plans, and wherein generating the build plan list comprises the processor to arrange each drawer build plan within the list based on the respective demand quantities.

3. The system of claim 1, wherein the inventory data comprises one or more inventory metrics associated with drawer component inventory, including a current inventory level, a forecasted inventory level, and a forecasted demand level, wherein the one or more inventory scenarios comprise an actual inventory scenario, an adjusted inventory scenario, and a revised inventory scenario.

4. The system of claim 1, wherein the drawer type is associated with a minimum quantity of central processor cores.

5. The system of claim 1, wherein the one or more constraints comprise a constraint associated with drawer design configuration weight, and wherein a drawer design configuration having a lowest weight is selected from the set of eligible drawer design configurations.

6. The system of claim 1, further comprising the processing device to format a drawer assignment list, including the processing device to assign each selected eligible drawer design configuration to a respective build plan, wherein the drawer assignment list comprises each selected drawer design configuration with its respective build plan, and wherein the transmitted information further comprises the drawer assignment list.

7. The system of claim 1, further comprising the processing device to update the one or more inventory scenarios in response to the selection, wherein the transmitted information further comprises the one or more updated inventory scenarios.

8. The system of claim 1, wherein the transmitted information further comprises a drawer design configuration diagram associated with each assigned drawer design configuration.

9. The system of claim 1, further comprising a report transmitted to a manufacture site in real-time, the report including the list of one or more build plans.

10. The system of claim 1, further comprising commencement of drawer production based on the constructed list of one or more build plans and drawer design configuration.

11. The system of claim 1, wherein the one or more constraints comprise requiring the selected drawer design configuration to have the fewest amount of drawer components from the set of eligible drawer design configurations.

12. The system of claim 1, further comprising a processing device to output a list of the eligible drawer design configurations.

13. A computer program product to configure server drawer build plans over a network to a remote subscriber computer, the computer program product comprising a computer-readable hardware storage device having computer-readable program code embodied therewith, the program code executable by a processor to:
provide an application to a remote subscriber for installation on a first computer;
output data associated with a data source of the first computer from the application, wherein the output data comprises demand data and inventory data; and
at a transmission server, receive the output dataset server over a network connection, wherein the transmission server comprises memory for storing remote subscriber information, the remote subscriber information comprising the received data and a destination address associated with a second computer, wherein the transmission server comprises a processing device, and wherein the processing device executes program code to:
generate a drawer build plan list comprising one or more drawer build plans based on the received dataset;
generate one or more inventory scenarios based on one or more inventory metrics associated with drawer components, wherein the drawer components comprise system controllers and central processors;
choose at least one drawer build plan from the drawer build plan list;
compare a plurality of drawer design configurations to at least one of the one of more inventory scenarios to produce a set of eligible drawer design configurations, wherein each drawer design configuration corresponds to a respective arrangement of the central processors by core number and performance level within slots of a drawer type of a respective chosen build plan;
select a drawer design configuration from the set of eligible drawer design configurations for one or more respective drawer build plans based on one or more constraints;
construct a list of one or more build plans based on demand data and the selected drawer design configuration; and
establish a connection to the second computer via the destination address, including transmit the constructed list to generate a build plan at a manufacturing site; and
manufacture a drawer for fulfilling an order based on the build plan generated at the manufacturing site.

14. The computer program product of claim 13, wherein the one or more metrics comprise a current inventory level, a forecasted inventory level, and a forecasted demand level, and wherein the one or more inventory scenarios comprise an actual inventory scenario, an adjusted inventory scenario, and a revised inventory scenario.

15. The computer program product of claim 13, further comprising program code executable by the processing device to format a drawer assignment list, including program code to assign each selected eligible drawer design configuration to a respective build plan, wherein the drawer assignment list comprises each selected drawer design configuration with its respective build plan, and wherein the transmitted information further comprises the drawer assignment list.

16. The computer program product of claim 13, further comprising program code executable by the processing device to update the one or more inventory scenarios in response to the selection, wherein the transmitted information further comprises the one or more updated inventory scenarios.

17. The computer program product of claim 13, further comprising a report transmitted to a manufacture site in real-time, the report including the list of one or more build plans.

18. The computer program product of claim 13, further comprising commencement of drawer production based on the constructed list of one or more build plans and drawer design configuration.

19. The computer program product of claim 13, wherein the one or more constraints comprise requiring the selected drawer design configuration to have the fewest amount of drawer components from the set of eligible drawer design configurations.

20. The computer program product of claim 13, further comprising programming code executable by the processing device to output a list of the eligible drawer design configurations.

* * * * *